(12) United States Patent
Laczik

(10) Patent No.: US 8,077,390 B2
(45) Date of Patent: Dec. 13, 2011

(54) METHOD OF PRODUCING AN OPTICAL ELEMENT THAT HAS SPATIAL VARIATION IN REFRACTIVE INDEX

(76) Inventor: Zsolt John Laczik, Oxford (GB)

(*) Notice: Subject to any disclaimer, the term of this patent is extended or adjusted under 35 U.S.C. 154(b) by 710 days.

(21) Appl. No.: 11/990,494

(22) PCT Filed: Aug. 14, 2006

(86) PCT No.: PCT/GB2006/003024
§ 371 (c)(1),
(2), (4) Date: Mar. 4, 2008

(87) PCT Pub. No.: WO2007/020412
PCT Pub. Date: Feb. 22, 2007

(65) Prior Publication Data
US 2009/0097116 A1    Apr. 16, 2009

(30) Foreign Application Priority Data
Aug. 15, 2005 (GB) .................. 0516711.9

(51) Int. Cl.
*G02B 5/30* (2006.01)
(52) U.S. Cl. .................. 359/487.06; 349/193
(58) Field of Classification Search .......... None
See application file for complete search history.

(56) References Cited

U.S. PATENT DOCUMENTS

| | | |
|---|---|---|
| 4,688,900 A | 8/1987 | Doane |
| 5,331,446 A | 7/1994 | Hirai et al. |
| 5,929,960 A | 7/1999 | West |
| 6,339,464 B1 * | 1/2002 | Anderson et al. ............ 349/187 |
| 2002/0080464 A1 | 6/2002 | Bruns |

FOREIGN PATENT DOCUMENTS

| | | |
|---|---|---|
| EP | 1 316 842 | 6/2003 |
| JP | 03111818 A * | 5/1991 |
| JP | 5 181403 | 7/1993 |
| JP | 5 215921 | 8/1993 |
| WO | 2005/78485 | 8/2005 |

OTHER PUBLICATIONS

Masuda et al.: "Optical properties of an UV-cured liquid-crystal microlens array," *Applied Optics*, OSA, Optical Society of America, Washington, D.C. vol. 37, No. 11, Apr. 1998, pp. 2067-2073, XP008058973.

Nose et al.: "Effects of low polymer content in a liquid-crystal microlens," *Optics Letters*, OSA, Optical Society of America, Washington, D.C., vol. 22, No. 6, Mar. 1997, pp. 351-353, XP000690325.

Chang et al.: "Liquid Crystal Lens Array," *IBM Technical Disclosure Bulletin*, IBM Corp., New York, vol. 24, No. 4. Sep. 1981, pp. 2030-2031, XP002233965.

Ye et al.: "Transient properties of a liquid-crystal microlens," *Japanese Journal of Applied Physics*, Tokyo, Japan, vol. 40, No. 10, Part 1, Oct. 2001, pp. 6012-6016.

* cited by examiner

*Primary Examiner* — Arnel C Lavarias
(74) *Attorney, Agent, or Firm* — Nixon & Vanderhye P.C.

(57) ABSTRACT

A method of producing an optical element that has spatial variation in refractive index includes providing a curable liquid crystal composition; applying a spatially varying electric field to the liquid crystal composition to induce a desired spatial variation in refractive index; and curing the liquid crystal composition while the electric field is still applied to fix the spatial variation in refractive index when the electric field is removed.

5 Claims, 3 Drawing Sheets

METHOD OF PRODUCING AN OPTICAL
ELEMENT THAT HAS SPATIAL VARIATION
IN REFRACTIVE INDEX

This application is the U.S. national phase of International Application No. PCT/GB2006/003024 filed 14 Aug. 2006 which designated the U.S. and claims priority to Great Britain Application No. 0516711.9 filed 15 Aug. 2005, the entire contents of each of which are hereby incorporated by reference.

This invention is concerned with optical elements, such as for providing spatially varying fixed phase correction or diffractive optical elements, and methods for making such elements.

These optical elements in general are similar to optical windows in shape, and ideally have unity transmission within their aperture. However, unlike optical windows, the optical phase shift introduced by the element has an exact predefined variation across the aperture of the element. In the case of phase correction elements, the phase variation is in general continuous; for diffractive optical elements the phase variation will in general also have abrupt steps in addition to regions of continuously varying phase shift.

Optical elements such as described above have many important applications. Fixed phase correction elements (PCE) can be used to correct wavefront aberrations in optical systems. In a well-corrected optical system, for a given reference surface, the optical phase is constant across the light beam. For example, for a focusing system the phase will be constant on spherical surfaces in the output beam, i.e. the output wavefront will be a perfect spherical one. If there are deviations from this constant phase, in other words there are wavefront aberrations present, different parts of the wave will meet out of phase at the focus, and destructive interference will occur. As a result of the destructive interference the focusing will be imperfect: the focused spot will spread out and the peak intensity in the spot will fall. Similarly, in an imaging system aberrations will cause blurring of the image and a fall in image contrast. Such aberrations can be corrected by inserting an optical element that has the same spatial phase shift profile as the phase deviations in the original beam, but the phase shifts have an opposite sign. The phase deviation and the phase shift introduced by the correcting element then cancel and a perfect wavefront results. An alternative application of these elements is to implement diffractive optics designs, known as diffractive optical elements, or DOEs. In this case predefined wavefront deviations are introduced intentionally to achieve specific optical effects. A simple example is to imprint a 1-D periodic phase shift on the original beam by inserting a phase grating, which will split the original single beam into multiple beams.

At present these optical elements are manufactured in plate glass (or other appropriate transparent optical material) by producing a predefined spatial surface height variation. The corresponding thickness variation then produces the desired spatially varying phase shift. The surface height variation can be produced by a variety of techniques, the main ones being diamond turning and reactive ion etching. Both of these production techniques are time consuming and very expensive. Another way to manufacture DOEs is by injection moulding or hot stamping plastics. However, the master for these processes still has to be produced by diamond turning or reactive ion etching, and the plastic components are generally of much inferior quality.

It is desirable to provide novel optical elements and improved methods of producing the optical elements.

According to a first aspect of the invention there is provided a method of producing an optical element that has spatial variation in refractive index, the method comprising:
  providing a curable liquid crystal composition;
  applying a spatially varying electric field to the liquid crystal composition to induce a desired spatial variation in refractive index; and
  curing the liquid crystal composition while the electric field is still applied to fix the spatial variation in refractive index when the electric field is removed.

According to another aspect of the invention there is provided a method of producing an optical element that has spatial variation in refractive index, the method comprising:
  providing a curable liquid crystal composition;
  applying a substantially uniform electric field to the liquid crystal composition to induce a desired refractive index;
  curing a portion of the liquid crystal composition, while the electric field is still applied, to fix the refractive index of that portion when the electric field is removed; and
  repeating the applying and curing steps, curing different portions of the liquid crystal composition each time, to cure the entire liquid crystal composition to form the optical element having a desired fixed spatial variation in refractive index.

According to a further aspect of the invention there is provided an optical element comprising material providing spatial variation in refractive index for providing spatial variation in phase retardation.

Preferably, according to any of the above aspects of the invention, the optical element or the curable liquid crystal composition for forming the optical element, is in the form of a lamella, i.e. it is generally sheet-like, such as in the form of a window or lens, and the lamella or sheet has a plane. The spatial variation in refractive index of the optical element is in the plane of the lamella, and the methods according to the invention can achieve this by spatially varying the applied electric field in the plane of the lamella and/or by curing different portions of the liquid crystal composition that are displaced from each other in the plane of the lamella under different applied electric field conditions. An alternative way to express this is that the optical element is generally planar and defines a direction perpendicular to its plane, which may be referred to as the optical axis. In use, light is typically incident on the element in a direction parallel to the optical axis. Preferably, in the optical element according to the invention, and produced by a method according to the invention, the spatial variation in refractive index is in the plane of the device and perpendicular to the optical axis.

Embodiments of the invention will now be described, by way of example only, with reference to the accompanying drawings in which:—

The optical elements according to embodiments of the invention described below are based on polymerised liquid crystal material, where the spatially varying phase shift is due to corresponding spatial variation in the alignment of the liquid crystal (LC) molecules. The alignment and orientation of the LC molecules with respect to the optic axis, i.e. the direction of light propagation through the element, affects the refractive index experienced by the propagating light, which may be referred to as the effective refractive index of the LC material. Differences in refractive index result in differences in phase shift, even with a uniform thickness of the optical element. A typical value for the refractive index of a polymeric LC is approximately 1.53. A difference in refractive index in the range of approximately 0.1 to 0.2 can be obtained between LC molecules aligned in one particular direction and LC molecules aligned in a different direction e.g. perpendicular to the first direction, or even randomly aligned. Thus a difference in refractive index of the order of 1% or larger is possible. The value of the refractive index can, of course, be continuously varied to take any value between the extremes defined by the above range.

A simplified description of the LC behaviour is as follows. The LC molecules have an elongated shape and in their normal phase the molecules tend to line up with their long axes parallel to each other. The overall orientation of the long axis can however rotate and can be aligned perpendicular or parallel to the optic axis, or can be oriented somewhere between the two extremes. An additional feature of the LC material is that it presents an effective refractive index for light passing through it that depends on the relative orientation of the LC molecule long axis and the polarisation direction of the incident light. For a given incident polarisation state, it is possible to control the effective refractive index of the LC material by controlling its alignment. This property is used in LC-based programmable spatial light modulators (SLMs) in which the LC material is sandwiched between two pixelated transparent electrodes. The local alignment of the LC material is controlled by applying specific voltages to each single pixel electrodes, which in turn results in a controlled programmable spatially varying phase shift. For some LC alignment schemes and using suitable additional polarisation optical components, this phase shift can be converted to an intensity variation which can provide contrast, for example when the SLM is used in a data projector.

Figure 1:
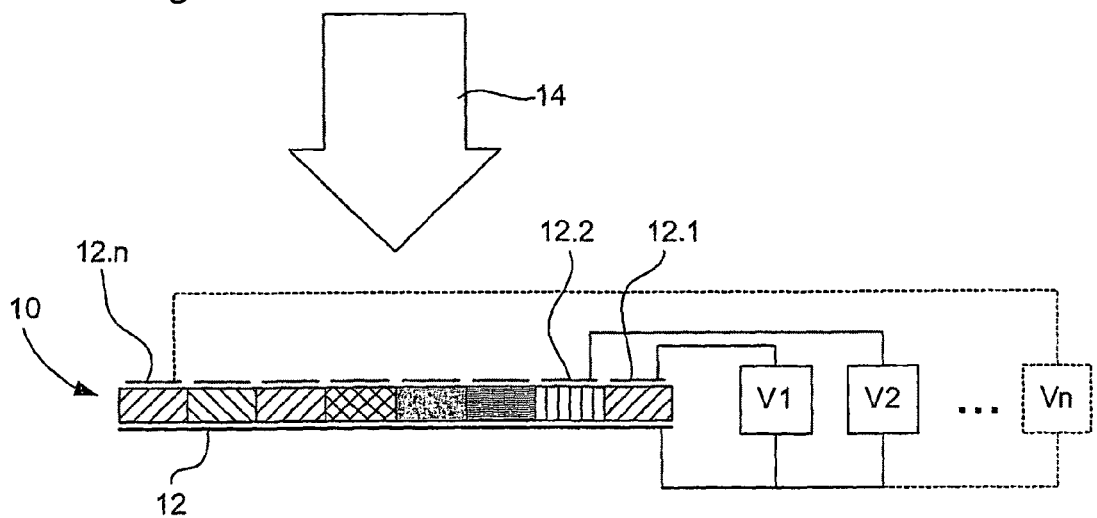
FIG. 1 is a schematic cross-sectional illustration of apparatus for performing a method according to a first embodiment of the invention.

A first embodiment of a method of the invention is illustrated in FIG. 1. An SLM cell 10 is filled with a liquid crystal composition comprising a polymer material or polymerisable material instead of the standard LC material. The LC composition used is initially in the liquid state and has the same characteristics as standard LC materials, however it has the additional property that it can be "cured" to fix the alignment of the molecules by polymerisation or cross-linking of the polymer material or a combination of the two, which freezes the molecules in a solid state. The curing is typically done by exposing the LC composition to short wavelength radiation, such as ultraviolet (UV) radiation, for example with a wavelength in the range 200 to 400 nm.

An example of a suitable class of liquid crystal materials for implementing the invention is known as reactive mesogens (RMs). A suitable LC composition comprises blends of reactive mesogens, photoinitiators, solvent and other additives. The photoinitiator absorbs the UV radiation and breaks down to form free radicals which start the polymerisation and/or cross-linking processes, but there is no chemical modification of the core of the LC molecules. The reactive mesogen can be acrylate based, for example a diacrylate reactive mesogen material RM257 (Merck Ltd), and a suitable photoinitiator is, for example, Daracur 4265 (Ciba).

Figure 2:
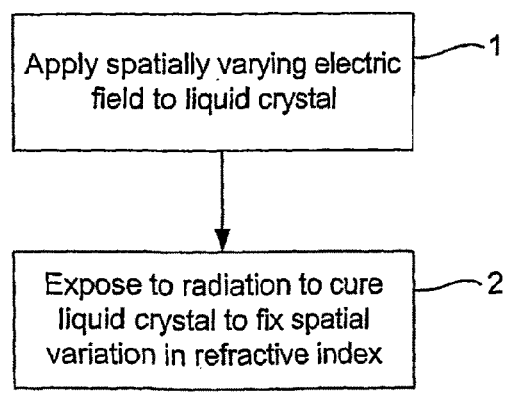
FIG. 2 is a flow chart of a method according to a first embodiment of the invention.

To produce a fixed PCE or DOE, according to step 1 in FIG. 2, the required phase profile is set up by applying the appropriate pixel voltages V1, V2, . . . Vn to the electrodes 12, 12.1, 12.2, . . . 12.n. The whole structure is then exposed to UV illumination 14; step 2 in FIG. 2. The electrodes are, of course, transparent or semi-transparent. Once curing is complete the pixel voltages can be removed and the cell can be used as a fixed element.

Figure 3:
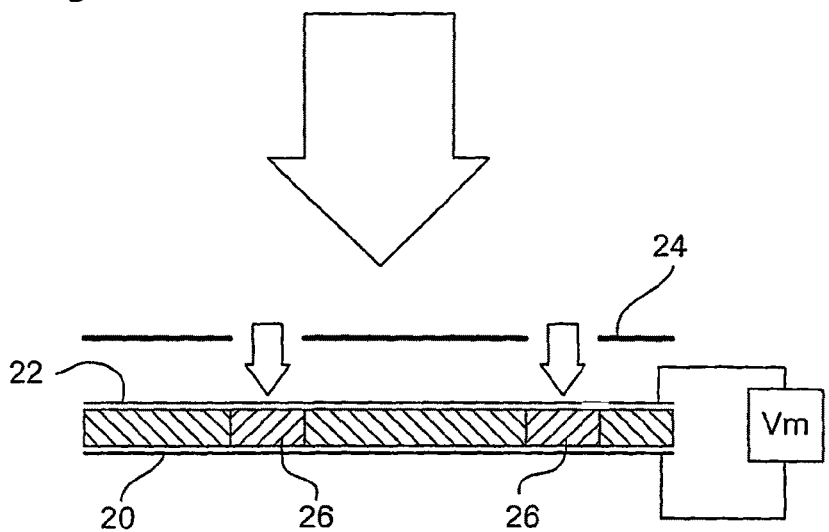
FIG. 3 is a schematic cross-sectional illustration of apparatus for performing a method according to a second embodiment of the invention.
Figure 4:
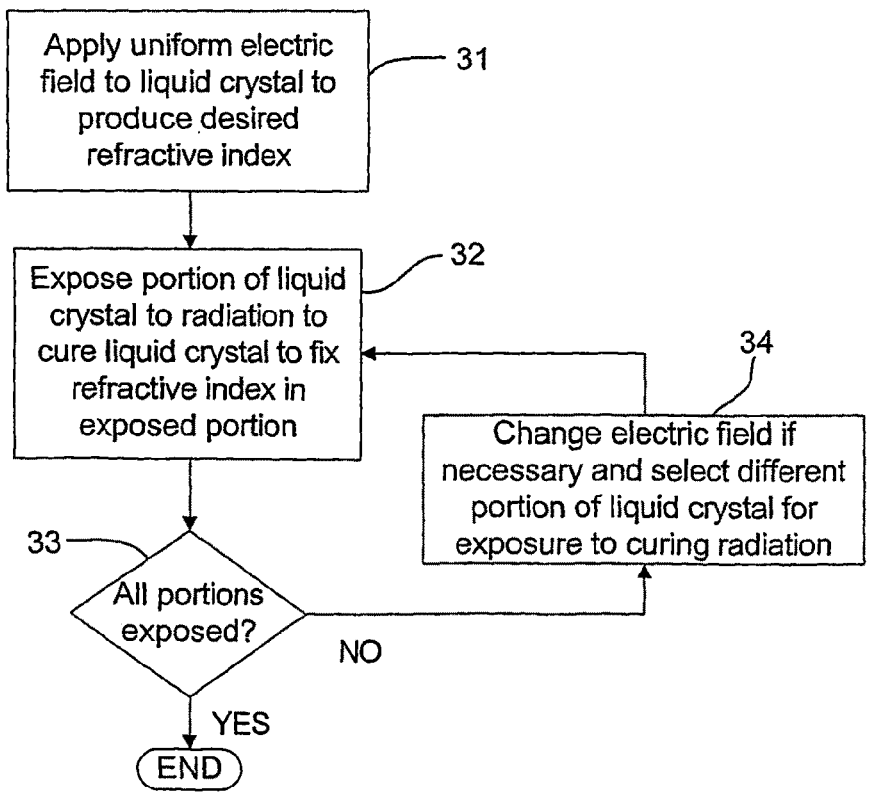
FIG. 4 is a flow chart of a method according to a second embodiment of the invention.

A second embodiment of the invention, illustrated in FIGS. 3 and 4, avoids the need for the pixelated electrodes which can be expensive and technologically complicated. Instead, only two large-area electrodes 20,22, which can be removable, are provided on either side of cell. A uniform electric field is applied (step 31), which globally aligns the liquid crystal to produce a particular refractive index (phase shift). However, only a single pixel is cured in this state, by allowing the UV radiation to expose only that pixel (step 32), for example by using a mask or defining the UV radiation as a fine beam. If further pixels remain to be exposed (step 33), the electric field is changed by changing the voltage Vm between the electrodes 20, 22 (step 34), as appropriate, to set the alignment of the next pixel, which is then exposed to UV. The steps 32, 33 and 34 are then iterated to serially expose pixels until the entire device has been completed. This serial exposure method can be further refined by using a UV projector or SLM 24, similar to standard data projectors, and expose all pixels 26 that have the same phase and alignment simultaneously together. Thus multiple pixels or regions can be exposed simultaneously. Once one set of pixels has been exposed (step 32), the voltage can be changed to its next value (step 34), and the next set of pixels can be exposed (step 32). The pixels described above could be a regular array of identical elements, but could equally be irregular or custom defined shapes or regions.

To achieve high accuracy phase shifts, a real-time feedback system can be used during fabrication according to either of the above embodiments. The device is placed in an interferometer that uses radiation of a wavelength with which the final device is designed to be used, i.e. longer than the wavelength of the UV radiation for curing the liquid crystal. The interferometer is used to monitor the phase shift of the pixel or region in question (for the second embodiment above), or even the spatial variation in phase over the entire device (for the first embodiment above). Based on the measured phase shift, the electrode voltage is continuously adjusted until the phase shift is set exactly at the desired target value. The UV exposure is then performed and the alignment is made permanent to achieve the desired target phase shift. The phase shift is of course proportional to the refractive index and the thickness of the LC, but using this feedback system it is not necessary to control precisely either the thickness or refractive index; all that is important is the final resultant phase shift, which is the property used in the finished optical element.

The final cured PCE or DOE could consist entirely of cured LC polymer. Alternatively, it can be formed on a substrate e.g. for mechanical strength and ease of handling. Furthermore, the LC polymer element can be provided on the surface of another optical component, such as a lens or a window, as a functional coating.

A number of different LC alignment schemes are possible; three LC alignment schemes are of particular interest here and will be described below.

The alignment of the LC molecules in the absence of an external electric field is primarily determined by the structure of the molecules, the surface properties of the cell top and bottom surfaces, the interaction of the molecules and those surfaces, and the temperature of the cell.

Figure 5:
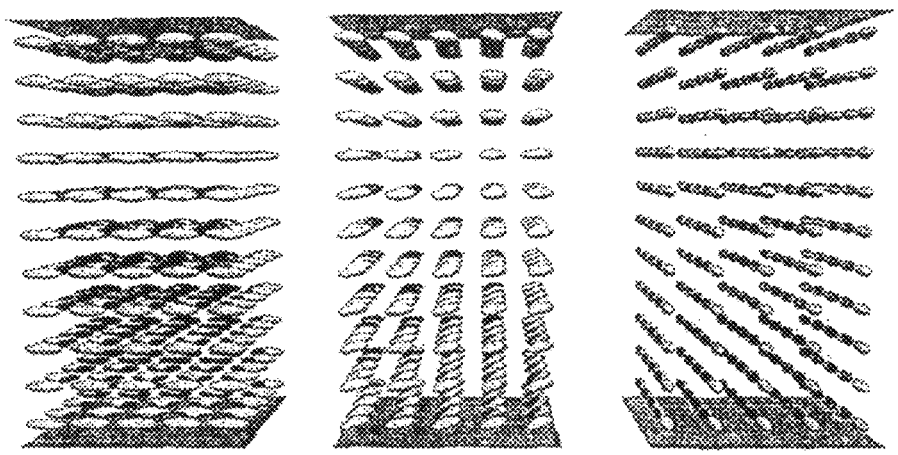
FIG. 5 illustrates a first liquid crystal alignment scheme.

For the first one, the LC molecules are aligned in the plane of the device (FIG. 5 shows three different orientations). Optical effects are achieved by setting the orientation of the long axis of the molecules with respect to the polarisation of the input light beam. This scheme is used for RM work reported in the prior art, and is most advantageous in applications where the polarisation state of the light beam is to be controlled.

Figure 6:
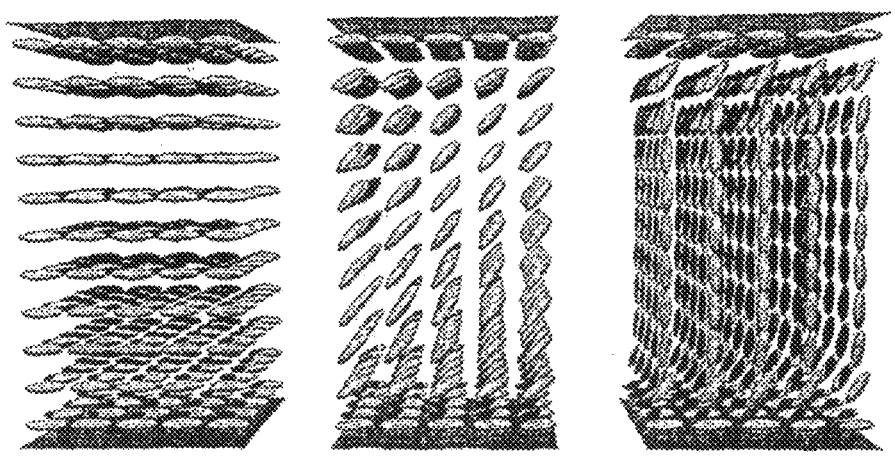
FIG. 6 illustrates a second liquid crystal alignment scheme.

For the second alignment scheme, the LC molecules are aligned in one particular orientation in the plane of the device (FIG. 6, left-hand illustration), or in the direction perpendicular to the plane of the device (FIG. 6, right-hand illustration), or in orientations between these two extremes (for example as shown in the central illustration of FIG. 6). This scheme is suitable for controlling the phase profile of the input beam and is the one used in the programmable devices. A significant disadvantage of this scheme is that the polarisation of the input beam has to be set at a fixed orientation with respect to the orientation of the in-plane LC molecules. This requirement makes the devices polarisation dependent.

Figure 7:
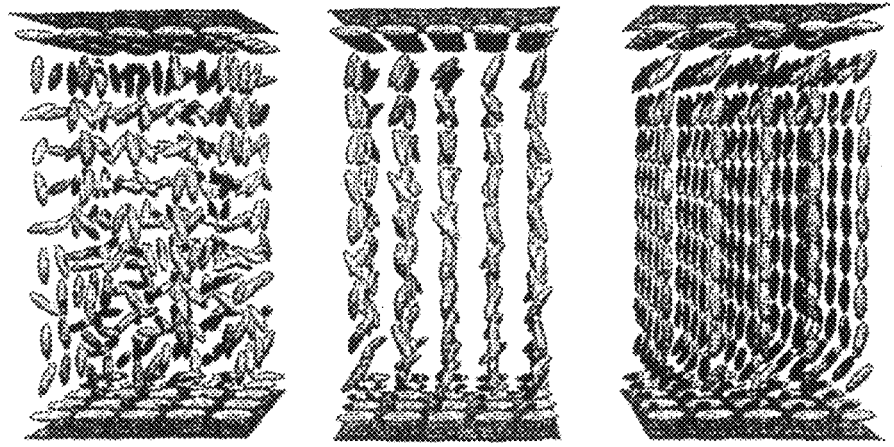
FIG. 7 illustrates a third liquid crystal alignment scheme.

For the third scheme, the LC molecules have random orientation (FIG. 7, left-hand illustration), are aligned perpendicular to the plane of the device (FIG. 7, right-hand illustration), or are aligned in orientations between these two extremes (FIG. 7 central illustration). This scheme operates in a manner similar to the second scheme, but with the added advantage of not being polarisation sensitive. The left-hand illustration of FIG. 7 is the case when no electric field is applied, and the middle and right-hand illustrations of FIG. 7 show the effects of increasing electric field applied by a voltage difference between electrodes situated above and below. In this case the LC molecules tend to align parallel to the electric field, though other cases are known in which the LC molecules have the property of aligning perpendicular to the electric field.

For the first two of the above three alignment schemes, the effect of each pixel can be represented by a Jones matrix of the form:

$$J = R(\theta)P(\Phi)R(-\theta) = \begin{pmatrix} \cos(\theta) & \sin(\theta) \\ -\sin(\theta) & \cos(\theta) \end{pmatrix} \begin{pmatrix} e^{j(\Phi+\frac{\Delta\Phi}{2})} & 0 \\ 0 & e^{j(\Phi-\frac{\Delta\Phi}{2})} \end{pmatrix} \begin{pmatrix} \cos(\theta) & -\sin(\theta) \\ \sin(\theta) & \cos(\theta) \end{pmatrix}$$

In the Jones matrix above: $\Phi$ is it the mean phase shift regardless of polarization, proportional to the thickness of the liquid crystal and the mean refractive index; and $\Delta\Phi$ is the difference between phase shifts introduced by a pixel for polarisation directions parallel and perpendicular to the LC molecule orientations in the plane perpendicular to optic axis, i.e. one linear polarization experiences a phase shift of $\Phi+\Delta\Phi/2$, and the orthogonal polarization experiences $\Phi-\Delta\Phi/2$.

$\theta$ represents the rotation about the optic axis between the polarisation direction of the input beam and the average LC molecule orientations in the plane perpendicular to optic axis (the rotational orientation of the pixel).

For the first scheme above, the relative phase shift $\Delta\Phi$ is the same for all the pixels, but the orientation $\theta$ varies from pixel to pixel. The net result is that the Jones matrix is not rotation invariant, and therefore the device is polarisation dependant.

For the second scheme above, the orientation $\theta$ is the same for all the pixels, but the relative phase shift $\Delta\Phi$ varies from pixel to pixel. The net result again is that Jones matrix is not rotation invariant, and therefore the device is polarisation dependant.

For the third scheme above, the effect of each pixel can be represented by a Jones matrix of the form:

$$J = \begin{pmatrix} e^{j(\Phi+\frac{\Delta\Phi}{2})} & 0 \\ 0 & e^{j(\Phi-\frac{\Delta\Phi}{2})} \end{pmatrix}$$

In this case the rotation matrix components are missing because the orientation of the LC molecules in the plane perpendicular to optic axis is completely random. However, the relative phase shift $\Delta\Phi$ varies from pixel to pixel. For this alignment scheme the Jones matrix is rotation invariant, and therefore the device is polarisation independent.

Consequently, in the preferred embodiment of the invention, the LC molecules, temperature and surface properties of the cell are selected such that the third alignment scheme prevails.

In the above description of the different schemes surface effects were ignored because the overall effect of each pixel is primarily determined by, the LC orientation in the bulk of the pixel; the layer of LC molecules near the top and bottom pixel surfaces may, or may not be oriented along a particular fixed direction, however this fixed surface layer does not significantly affect the overall phase shift introduced by the pixel. There are also several other more complicated alignment schemes, e.g. twisted nematic, which are possible. The invention is not limited to using any specific alignment scheme.

Although embodiments of the invention have been described above in terms of applying an electric field to the LC to orient the molecules by means of a voltage applied to electrodes, it is also possible to achieve the same effect by other means, such as influencing the alignment by the electric field generated by a high power optical beam.

An optical element according to the present invention, having a spatial variation in refractive index and hence in phase shift (retardation), can be used in many applications. For example, as a waveplate in a data projector to improve contrast; in microscopy, such as super-resolution microscopy, to improve depth of field, and in 3D volume imaging; in laser machining or laser writing to adjust the beam intensity profile, such as converting a gaussian profile to a top-hat profile; or in beam splitting e.g. to divide a light beam into multiple beams for telecommunications or laser machining. These are merely a few examples of industrial applications of the invention.

The invention claimed is:

1. A method of producing an optical element that has a desired fixed spatial variation in refractive index, the method comprising:
   providing a curable liquid crystal composition;
   applying a substantially uniform electric field to the liquid crystal composition to induce a desired refractive index;
   curing a portion of the liquid crystal composition, while the electric field is still applied, to fix the refractive index of that portion when the electric field is removed; and
   repeating the applying and curing steps, curing different portions of the liquid crystal composition each time, to cure the entire liquid crystal composition to form the optical element having the desired fixed spatial variation in refractive index, wherein the applied electric field is adjusted prior to each curing step, and wherein the curable liquid crystal composition is provided in a form of a lamella defining a plane, and the different portions of the liquid crystal composition cured each time are displaced from each other in the plane of the lamella, to provide spatial variation in refractive index over the plane of the lamella.

2. A method according to claim 1, wherein the liquid crystal composition is cured by exposure to radiation with a wavelength shorter than a predetermined value, and wherein the portion of the liquid crystal composition exposed in each curing step is defined by a spatial light modulator or mask or by writing using a beam of the radiation.

3. A method according to claim 1, further comprising:
prior to the or each curing step, passing radiation through at least a portion of the liquid crystal composition;
determining a phase-shift induced in the radiation by passage through the liquid crystal composition; and
adjusting the applied electric field to vary the refractive index of the liquid crystal composition until the phase-shift corresponds with a desired target value.

4. A method according to claim 1, wherein the liquid crystal composition comprises a reactive mesogen.

5. An optical element produced according to the method of claim 1.

* * * * *